No. 738,118. PATENTED SEPT. 1, 1903.
A. R. MULVANE.
NUT LOCK.
APPLICATION FILED DEC. 8, 1902.
NO MODEL.
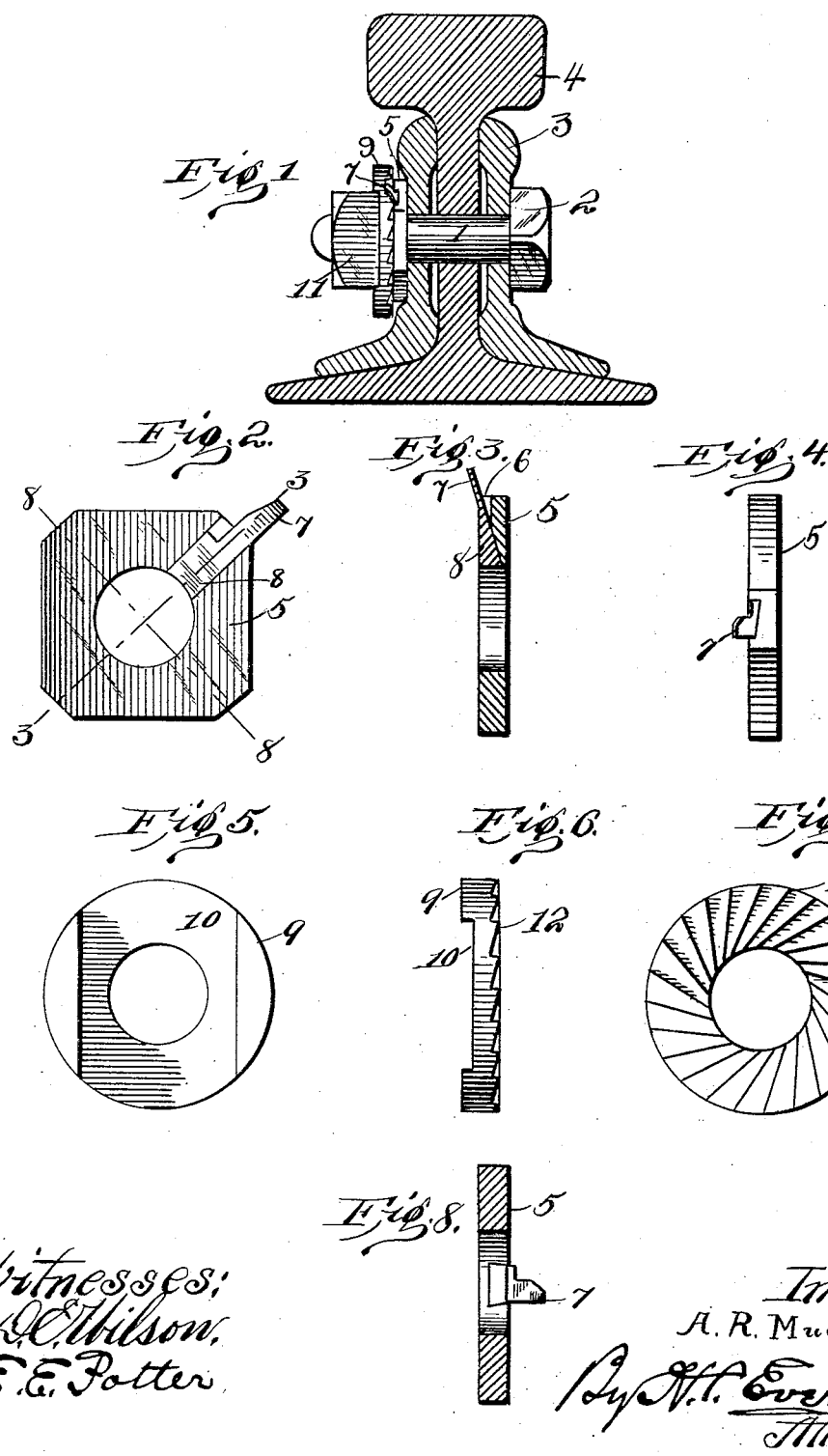
Witnesses:
D. C. Wilson,
E. E. Potter.
Inventor:
A. R. Mulvane,
By Everh &
Attorneys
THE NORRIS PETERS CO., PHOTO-LITHO., WASHINGTON, D. C.

No. 738,118. Patented September 1, 1903.

UNITED STATES PATENT OFFICE.

ALBERT R. MULVANE, OF CORAOPOLIS, PENNSYLVANIA.

NUT-LOCK.

SPECIFICATION forming part of Letters Patent No. 738,118, dated September 1, 1903.

Application filed December 8, 1902. Serial No. 134,402. (No model.)

*To all whom it may concern:*

Be it known that I, ALBERT R. MULVANE, a citizen of the United States of America, residing at Coraopolis, in the county of Allegheny and State of Pennsylvania, have invented certain new and useful Improvements in Nut-Locks, of which the following is a specification, reference being had therein to the accompanying drawings.

This invention relates to certain new and useful Improvements in nut-locks, and has for its object to provide novel and effective means for securely locking a nut upon a bolt without requiring any mutilating of the threads of said bolt in any manner whatever.

My invention has for its further object to construct a nut-lock which may be employed in any ordinary connections where it is desired to securely lock a nut upon its bolt.

Briefly described, the invention comprises, in connection with the ordinarily-threaded bolt, a washer which is provided with a spring tongue or bolt which is adapted to engage with ratchet-teeth formed on the inner face of the supplemental washer, the latter being mounted on the bolt and provided at its outer face with a seat formed by cutting away the outer face of the supplemental washer, so that the nut will seat therein.

All of the above construction will be hereinafter more fully described and then specifically pointed out in the appended claims, and in describing the invention in detail reference is had to the accompanying drawings, forming a part of this specification, and wherein like numerals of reference indicate like parts throughout the several views, in which—

Figure 1 is a transverse vertical sectional view of a railroad-rail and the fish-plates, showing the application of my improved nut-lock to the bolt thereof. Fig. 2 is a plan view of the inner washer. Fig. 3 is a cross-sectional view on the line 3 3 of Fig. 2. Fig. 4 is a top plan view of the washer. Fig. 5 is a plan view of the outer and supplemental washer. Fig. 6 is a side elevation of the same. Fig. 7 is a plan view showing the inner face of this washer. Fig. 8 is a cross-sectional view of the inner washer, taken on the line 8 8 of Fig. 2.

To put my invention into practice, I employ a bolt 1, which is provided with the ordinary form of threads and any suitable or desired style of head 2. In the accompanying illustration of my invention I show the nut-lock as applied to a bolt employed for fastening the fish-plates 3 3 to a railroad-rail 4. In practice the outer face of one or both of the fish-plates is provided with a recess or longitudinal groove in which the inner washer 5 is mounted, this preventing the same from turning. It will be evident that this inner washer could be made of a width whereby its lower edge would engage the upper face of the rail-base, and it would thus be prevented from turning, the same as though it were mounted in a recess in the fish-plate. Where the bolt is passed through wood or other like material, it will be necessay that the washer 5 be countersunk into the wood, so as to prevent said washer from turning. This inner washer 5 is provided in its outer face at one corner thereof with a recess 6, the bottom wall of which is preferably made at a slight inclination, as best seen in Fig. 3 of the drawings. In this recess is centrally mounted a spring catch or pawl 7, the base of which is of a thickness whereby the outer face of said pawl will be flush with the outer face of the washer, thus completely filling the recess 6 at the inner portion thereof, but leaving a space back of the spring portion 7 of the pawl or catch. As stated, this inner washer 5 is mounted on the bolt, and after it has been placed in position the supplemental or outer washer 9 is placed on the bolt in contact with the inner washer 5. This outer washer 9 is provided on its outer face with a cut-away portion or recess 10, into which the nut 11 is adapted to seat. The inner face of the washer 9 is provided with a series of teeth 12, forming the ratchets, which are adapted to engage and lock with the spring or pawl 7, carried by the inner washer 5. These teeth or ratchets 12, it is to be noted, are not cut radially on the face of the washer, but all extend at an angle to a radial line, as best seen in Fig. 7 of the drawings, whereby the shoulder or edge of the teeth will more securely lock against the spring or pawl 7. The teeth or ratchets 12, as the washer 9 and nut 11 are tightened, firmly engage against the outer face of the washer 5, and the spring engaging back of each successive tooth or ratchet effectually prevents the unscrewing of the ratchet-washer and the nut, which are locked together by reason of the nut being partially embedded in the washer. When it is desired to remove the nut, the spring 7 is depressed within the recess 6, so as to move the same out of the path of the teeth in the backward movement of the washer 9, thus allowing the free unscrewing of the said washer and the nut 11. As the recess 6 is cut with its base at an incline, the spring 7 projects therethrough at an incline to the central plane of the washer, and for this reason it is more firmly engaged by the ratchet-teeth 12.

While I have herein shown and described in detail my invention as it is in practice, yet it will be observed that various slight changes may be made in the details of construction without departing from the general spirit of the invention.

Having fully described my invention, what I claim as new, and desire to secure by Letters Patent, is—

In a nut-lock, the combination with a bolt, of a washer having a recess, a spring tongue or pawl lodged in said recess with a portion thereof flush with the outer face of the washer and a part thereof projecting normally beyond the outer face of the washer, a ratchet-washer adapted to engage with said spring tongue or pawl and provided in its outer face with a recess, and a nut engaging in said recess to be revolved on the bolt in unison with the ratchet-washer, substantially as described.

In testimony whereof I affix my signature in the presence of two witnesses.

ALBERT R. MULVANE.

Witnesses:
A. M. WILSON,
E. E. POTTER.